United States Patent [19]
Kunert

[11] Patent Number: 5,969,328
[45] Date of Patent: *Oct. 19, 1999

[54] PORTABLE HAND-HELD DATA TERMINAL HAVING CURVILINEAR HOUSING AND KEYPAD

[75] Inventor: Steven R. Kunert, Cedar Rapids, Iowa

[73] Assignee: Intermec IP Corp, Woodland Hills, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/752,452

[22] Filed: Nov. 15, 1996

Related U.S. Application Data

[60] Provisional application No. 60/006,920, Nov. 17, 1995.

[51] Int. Cl.$^6$ .................................................. G06K 7/10
[52] U.S. Cl. ............... 235/472.01; 235/454; 235/462.45; 361/686
[58] Field of Search .................................. 235/472, 454, 235/462, 486, 385, 472.01, 472.02, 462.45, 462.46, 462.47; 361/686, 683, 749

[56] References Cited

U.S. PATENT DOCUMENTS

| | | | |
|---|---|---|---|
| 4,281,404 | 7/1981 | Morrow, Jr. et al. | 367/108 |
| 4,983,818 | 1/1991 | Knowles | 235/472 |
| 5,059,778 | 10/1991 | Zouzoulas et al. | 235/472 |
| 5,175,672 | 12/1992 | Conner et al. | 361/393 |
| 5,305,181 | 4/1994 | Schultz | 361/680 |
| 5,349,497 | 9/1994 | Hanson et al. | 361/683 |
| 5,357,065 | 10/1994 | Mitamura et al. | 361/749 X |
| 5,406,063 | 4/1995 | Jelen | 235/472 |
| 5,410,141 | 4/1995 | Koenck et al. | 235/472 |
| 5,418,684 | 5/1995 | Koenck et al. | 235/472 |
| 5,477,044 | 12/1995 | Akagon | 235/472 |
| 5,489,770 | 2/1996 | Kadota et al. | 235/472 |
| 5,506,394 | 4/1996 | Plesko | 235/472 |
| 5,543,609 | 8/1996 | Giordano et al. | 235/472 X |
| 5,581,492 | 12/1996 | Janik | 361/680 X |
| 5,587,577 | 12/1996 | Schultz | 235/472.02 X |
| 5,610,387 | 3/1997 | Bard et al. | 235/472.02 |
| 5,610,602 | 3/1997 | Hargreaves | 361/749 X |
| 5,615,088 | 3/1997 | Mizumo | 361/749 |
| 5,657,201 | 8/1997 | Kochis | 235/472 X |
| 5,679,943 | 10/1997 | Schultz et al. | 235/472.02 |
| 5,715,140 | 2/1998 | Sinkunas et al. | 361/749 X |
| 5,742,480 | 4/1998 | Sawada et al. | 361/749 |

FOREIGN PATENT DOCUMENTS

| | | |
|---|---|---|
| 2-306385 | 1/1989 | Japan . |
| WO 88/02520 | 4/1988 | WIPO . |
| WO 90/16033 | 12/1990 | WIPO . |

*Primary Examiner*—Michael G. Lee
*Attorney, Agent, or Firm*—Suiter & Associates PC

[57] ABSTRACT

A portable hand-held data terminal having a curvilinear cross-sectional keypad capable of operation by one hand. In an exemplary embodiment of the invention the keys may extend to various heights above the keypad depending on their function. For example, a scan trigger key may extend the farthest from the terminal, numeric keys may extend the next farthest, and alphabetic keys may extend the least. The data terminal may also provide a quick release pistol grip to terminal attachment which utilizes, in an exemplary embodiment, a pair of removably receivable compressible O-rings, a pair of removably receivable guides, and a lever-type latch mechanism. The invention may also provide an interface between the pistol grip assembly's trigger mechanism and the data terminal which does not require that the housing of the data terminal be pierced. In an exemplary embodiment this interface utilizes a reed switch, mounted inside the data terminal's housing, and a magnetic trigger assembly wherein the reed switch is held closed by the magnet when the trigger is depressed.

7 Claims, 6 Drawing Sheets

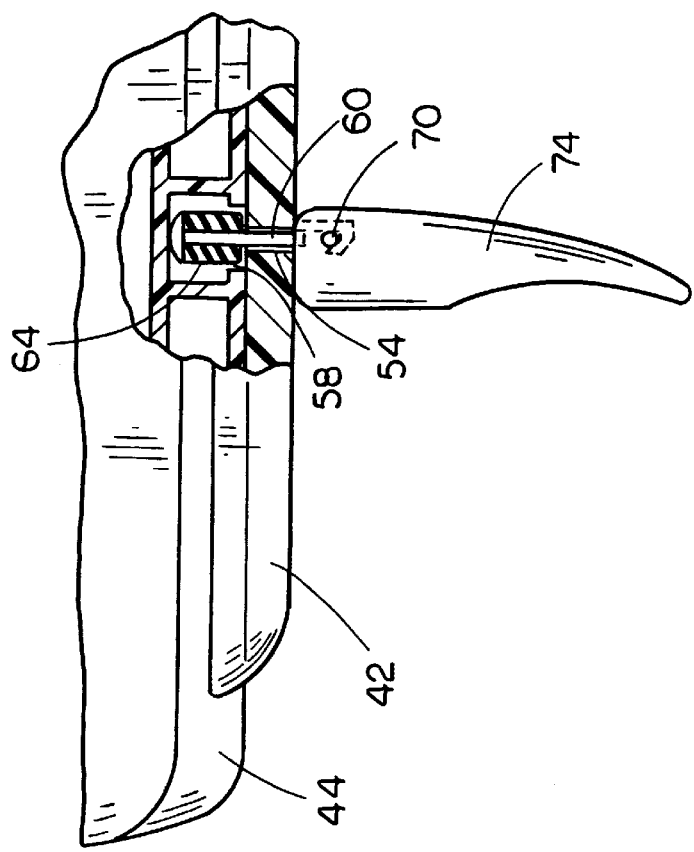
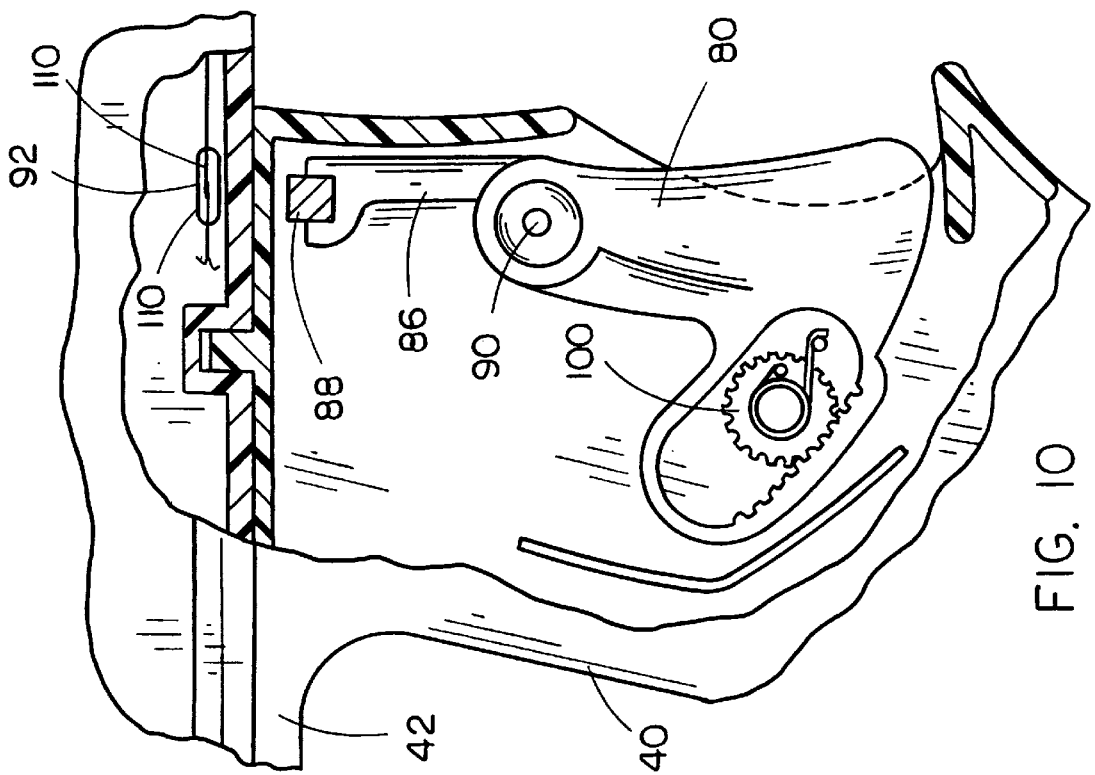

PORTABLE HAND-HELD DATA TERMINAL HAVING CURVILINEAR HOUSING AND KEYPAD

CROSS REFERENCES

The present application claims the benefit, under 35 USC 119(e), of the U.S. Provisional Application Ser. No. 60/006,920, filed Nov. 17, 1995. Said Provisional Application is herein incorporated in its entirety.

TECHNICAL FIELD

The present invention relates generally to portable hand-held data terminals and specifically to portable hand-held data terminals having alpha-numeric keypads and removable pistol grip assemblies.

BACKGROUND OF THE INVENTION

Portable hand-held data terminals enjoy a variety of uses in many different industries. A desirable characteristic of these data terminals is that they must be convenient to operate by a user while he is engaged in performing other, more demanding tasks. Specifically, a user may find it necessary to operate the data terminal with one hand, thus leaving his other hand free. For example, the user of a data terminal equipped with a optical character set reader, may find it desirable to lift or otherwise shift small items of inventory with one hand while simultaneously operating the data terminal's optical character set reader to scan an optical character set affixed to that item. Likewise, it may be desirable to mate a data terminal equipped with a optical character set reader with a removable pistol grip assembly. The pistol grip assembly's trigger mechanism must be mechanically or electrically connected to the data terminal so that the user, by depressing the trigger, may command the data terminal's optical character set reader to scan a target. However, data terminals must capable of operating in severe, often hostile environments. Thus it is desirable for these data terminals to have environmentally sealed housings to prevent damage to their internal electronic components. Consequently, means of connecting the pistol grip assembly's trigger mechanism through an environmentally sealed housing may prove to be expensive to manufacture and difficult to design.

SUMMARY OF THE INVENTION

Therefore, an object of the present invention is to provide a portable hand held data terminal having a curvilinear cross-sectional keypad wherein the keys of the keypad may extend through the keypad to various heights. For example, a scan trigger key may extend the farthest from the terminal, numeric keys may extend the next farthest, and alphabetic keys may extend to least.

Another object of the present invention is to provide a quick release pistol grip to terminal attachment which utilizes, in an exemplary embodiment, a pair of removably receivable compressible O-rings, a pair of removably receivable guides, and a lever-type latch mechanism.

A further object of the present invention is to provide an interface between a pistol grip assembly's trigger mechanism and the data terminal which does not require that the housing of the data terminal be pierced. In an exemplary embodiment this interface utilizes a reed switch, mounted inside the data terminal's housing and a magnetic trigger assembly wherein the reed switch is held closed by the magnet when the trigger is depressed.

The present invention provides a portable hand-held data terminal having a curvilinear cross-sectional keypad capable of operation by one hand. In an exemplary embodiment of the invention the keys may extend to various heights above the keypad depending on their function. For example, a scan trigger key may extend the farthest from the terminal, numeric keys may extend the next farthest, and alphabetic keys may extend to least. The keys may be mounted on a circuit board having the same curvilinear cross-section as the keypad. This circuit board may be either rigid or flexible.

The present invention may also provide a quick release pistol grip to terminal attachment which utilizes, in an exemplary embodiment, a pair of removably receivable compressible O-rings, a pair of removably receivable guides, and a lever-type latch mechanism. An interface between the pistol grip assembly's trigger mechanism and the data terminal which does not require that the housing of the data terminal be pierced may also be provided. In an exemplary embodiment, this interface utilizes a reed switch, mounted inside the data terminal's housing and a magnetic trigger assembly wherein the reed switch is held closed by the magnet when the trigger is depressed.

These and other features, aspects, and advantages of the present invention will become better understood with regard to the following description, appended claims, and accompanying drawings.

BRIEF DESCRIPTION OF THE DRAWINGS

FIG. 10 is a partial cross-sectional side elevational view of the pistol grip assembly attached to the data terminal further illustrating the reed switch/magnetic trigger assembly;

FIG. 11 is a partial cross-sectional side elevational view of the pistol grip assembly attached to the data terminal further illustrating the attachment mechanism.

DETAILED DESCRIPTION OF THE INVENTION

Figure 1:
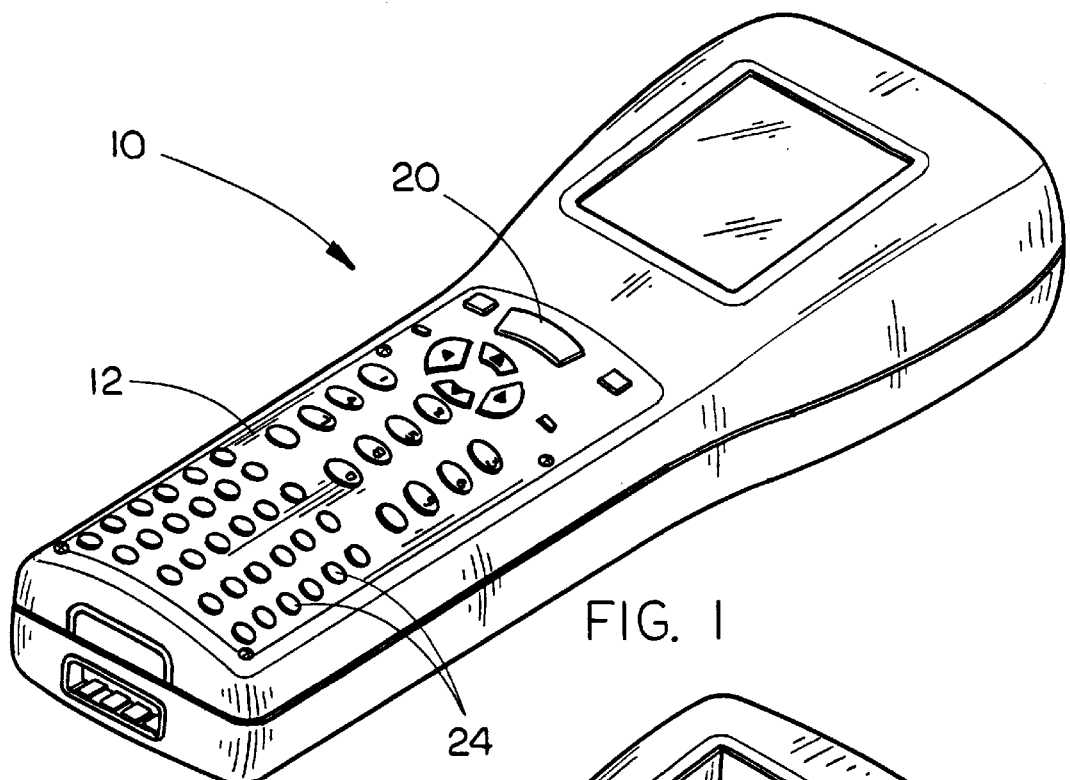
FIG. 1 is a pictorial view of a portable hand-held data terminal featuring a keypad having a curvilinear cross-section.

FIG. 1 is a pictorial view of an exemplary embodiment of the present invention illustrating a portable hand-held data terminal 10 which comprises a keypad 12 having a curvilinear cross-section.

Figure 2:
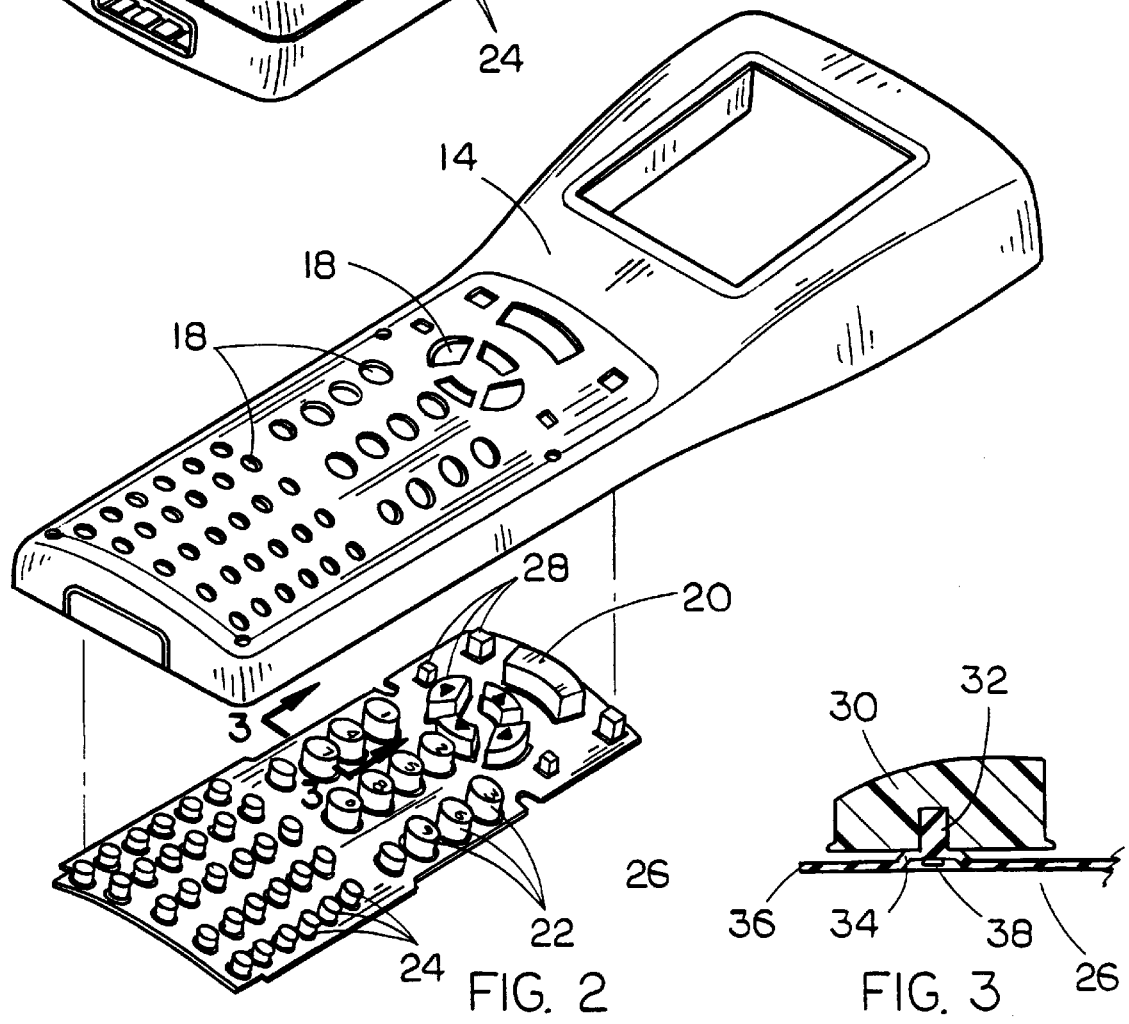
FIG. 2 is an exploded view of the data terminal shown in FIG. 1.

FIG. 2 is an exploded view of the data terminal shown in FIG. 1. The top shell 14 of the data terminal's housing, which may be fabricated from plastic, metal, or the like, may be molded to have a curvilinear cross-section. Apertures 16 may be cut, molded or otherwise fabricated into the top shell 14. Keys (20, 22, & 24) may be attached to a circuit board 22. This circuit board 26 may be rigid or flexible and may have a curvilinear cross-section similar to that of the top shell 14 such that the circuit board 26 may rest against the inside surface of the top shell 14 allowing keys (20, 22, 24 & 28) to extend through the apertures 16 in the top shell 14. Keys (20, 22, 24 & 28) may extend through the apertures 16 to various heights according to their function so that the user may, by sense of touch, determine which keys he is pressing. For example, a scan trigger key 20, which may be used to activate a optical character set reader (not shown) or the like may extend the farthest from the keypad. Numerical keys 22 may extend the next farthest, and alphabetic keys 24 may extend the least. Keys having other functions 28 may likewise extend to a different height if desired.

Figure 3:
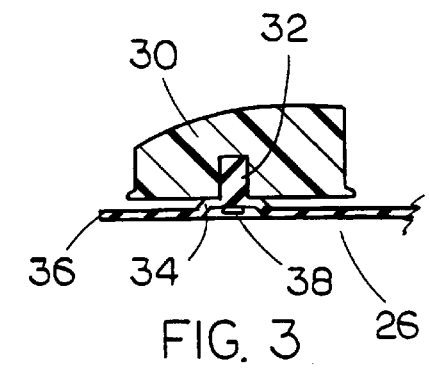
FIG. 3 is a cross-sectional side elevational view of a key assembly from the keypad of the embodiment disclosed in FIG. 1.

FIG. 3 is a cross-sectional side elevational view of a key from the keypad of data terminal disclosed in FIG. 1. The key 30 may be attached by tab 32 to a resilient boot 34. This resilient boot 34 may be molded into a flexible sheet 36 covering the circuit board 22. The tab 32 may be integrally molded into the boot 34. When the key 30 is depressed by the user, the boot 34 is collapsed allowing a contact 38 to be pressed against a second contact on the circuit board 26. An electrical circuit is thus completed between the two contacts indicating to the data terminal's processor (not shown) that the key 30 has been depressed. Preferably, when the user releases the key 30, the resilient boot 34 returns to its un-collapsed shape, forcing the key 30 to return to its non-depressed position.

Figure 4:
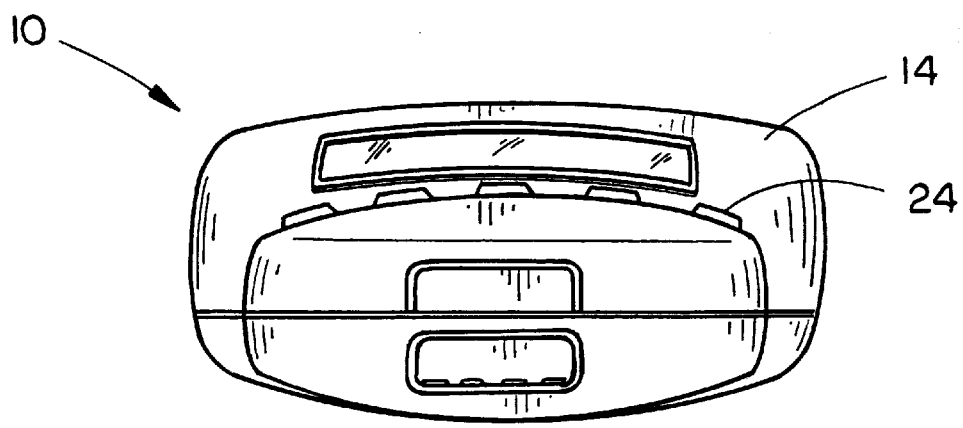
FIG. 4 is an elevational view of the bottom end of the data terminal disclosed in FIG. 1 illustrating the curvilinear cross-section of the keypad.
Figure 5:
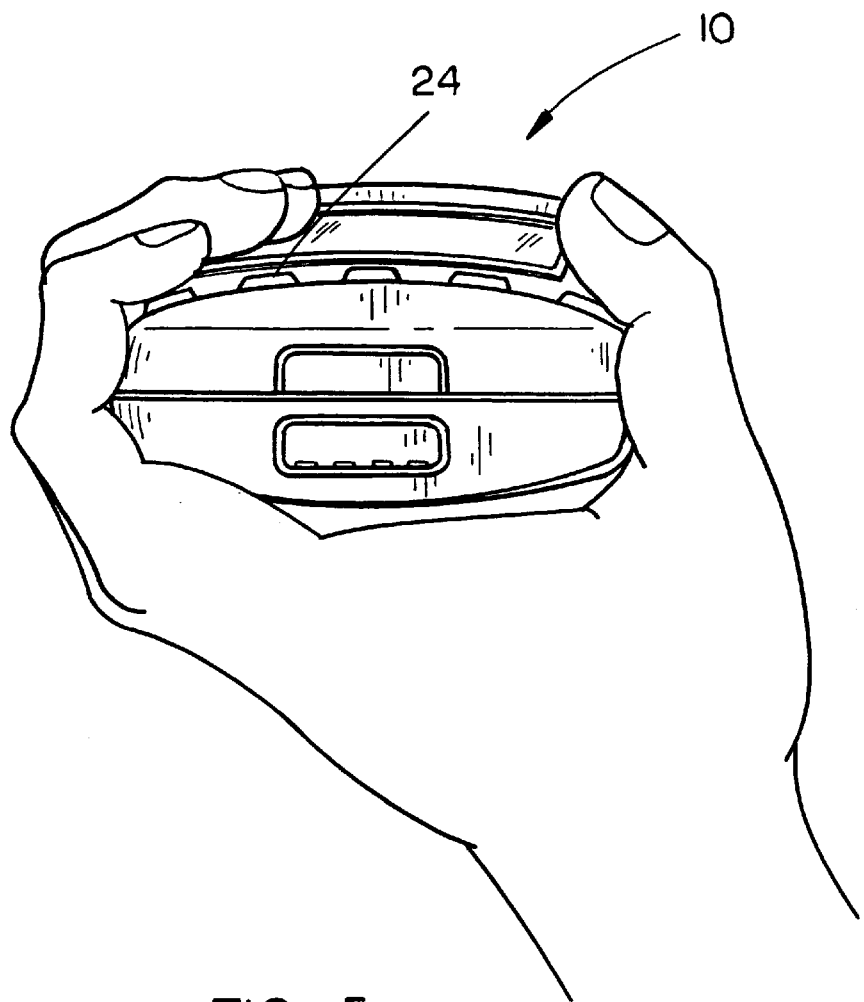
FIG. 5 is an elevational view of the bottom end of the data terminal illustrating how a user may grip the terminal during operation.

FIGS. 4 and 5 are elevational views of the bottom end of the data terminal disclosed in FIG. 1. FIG. 4 clearly illustrates the curvilinear cross-section of the keypad. FIG. 5 illustrates how a user may grip the data terminal during operation. The user may operate the data terminal with one hand if necessary, depressing keys on the keypad much like a guitarist works a fret keyboard.

Figure 6:
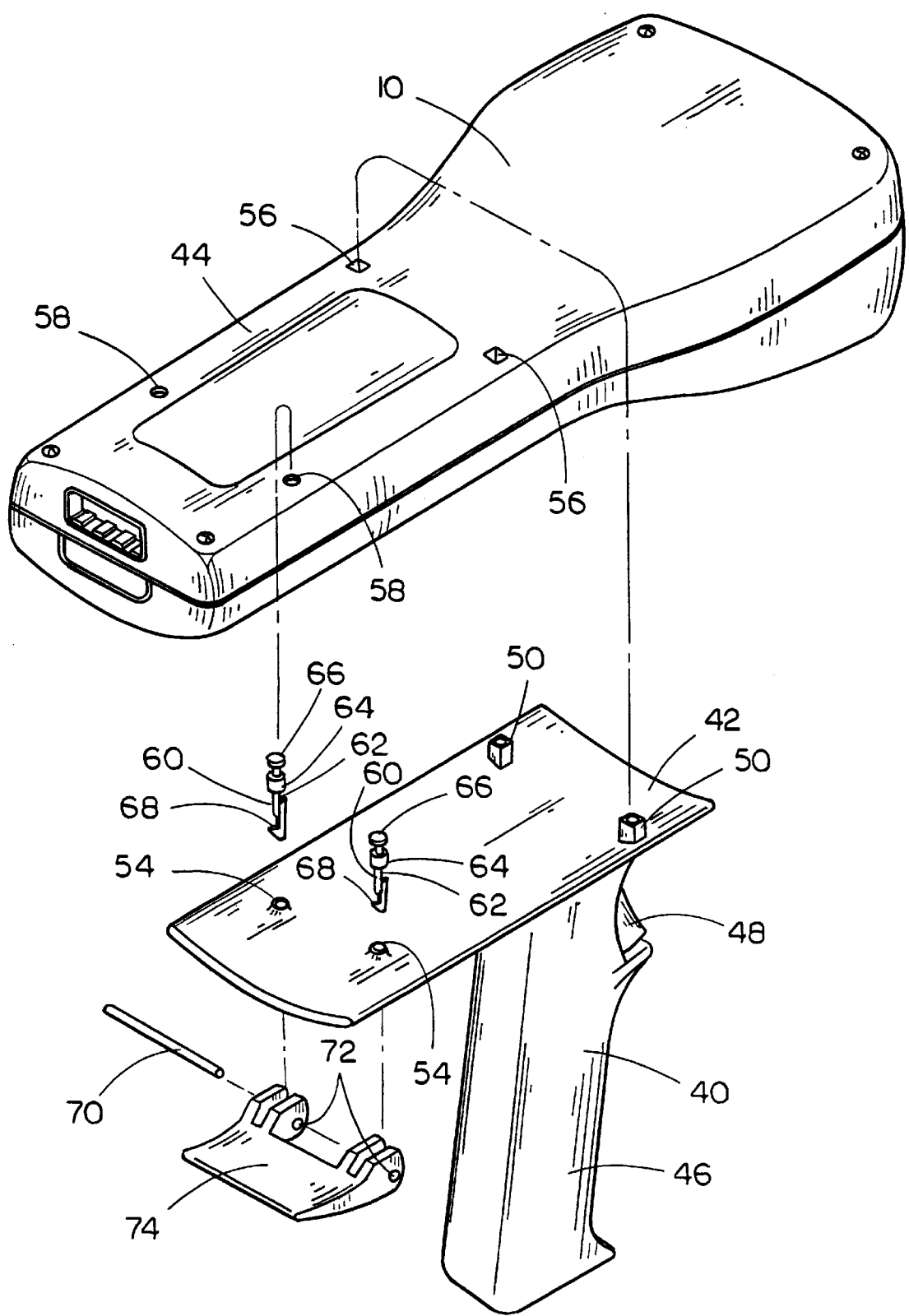
FIG. 6 is and exploded view depicting the attachment of a pistol grip assembly to the data terminal disclosed in FIG. 1.

FIG. 6 is an exploded view depicting the attachment of a pistol grip assembly to the data terminal disclosed in FIG. 1. The pistol grip assembly 40 may comprise a generally horizontal mounting plate 42 shaped to conform to the bottom shell 44 of the data terminal 10 and a grip 46 containing a trigger 48. Preferably, the grip 46 is ergonomically designed to fit the typical user's hand. Tabs 50 may be molded or otherwise attached to near the forward end of the top surface 52 of the mounting plate 42. Similarly, holes 54 may be disposed near the mounting plate's rear edge. Correspondingly, the bottom shell 44 of the data terminal 10 may have disposed in it rectangular notches 56 and round holes or cavities 58. Preferably, the tabs 50 attached to the mounting plate 42 may be removably insertable into the notches 58 when the pistol grip assembly 40 is mated with the data terminal 10 to properly position the grip. Removeably receivable guides 60, comprising cylindrical shafts 62 onto which O-rings 64 may be mounted, may extend through holes 54 in the mounting plate 42. These guides 60 may have a flattened head 66 to retain the O-rings 64. Preferably, the bottom ends of the guides 60 terminate in hooks 68. These hooks 68 may extend through the holes 54 in the mounting plate 42 to hook around a horizontal shaft 70 which passes through holes 72 in a lever-type latch 74. When the lever-type latch 74 is rotated to the latched position (flush to the bottom surface of the horizontal mounting plate 42), the guides 60 are pulled downward compressing the O-rings 64 against the interior edges of the holes 58 in the bottom shell 44 of the data terminal 10. Preferably, when compressed, the O-rings 64 will not pass through the holes 58. In this manner, the pistol grip assembly 40 may be securely attached to the bottom shell 44 of the data terminal 10. When the lever-type latch 74 is rotated to the unlatched position (perpendicular to the bottom surface of the horizontal mounting plate 42) the guides 60 are released upward allowing the O-rings 64 to expand and slide through the holes 58 in the bottom shell 44 of the data terminal 10, releasing the pistol grip assembly 40.

Figure 7:
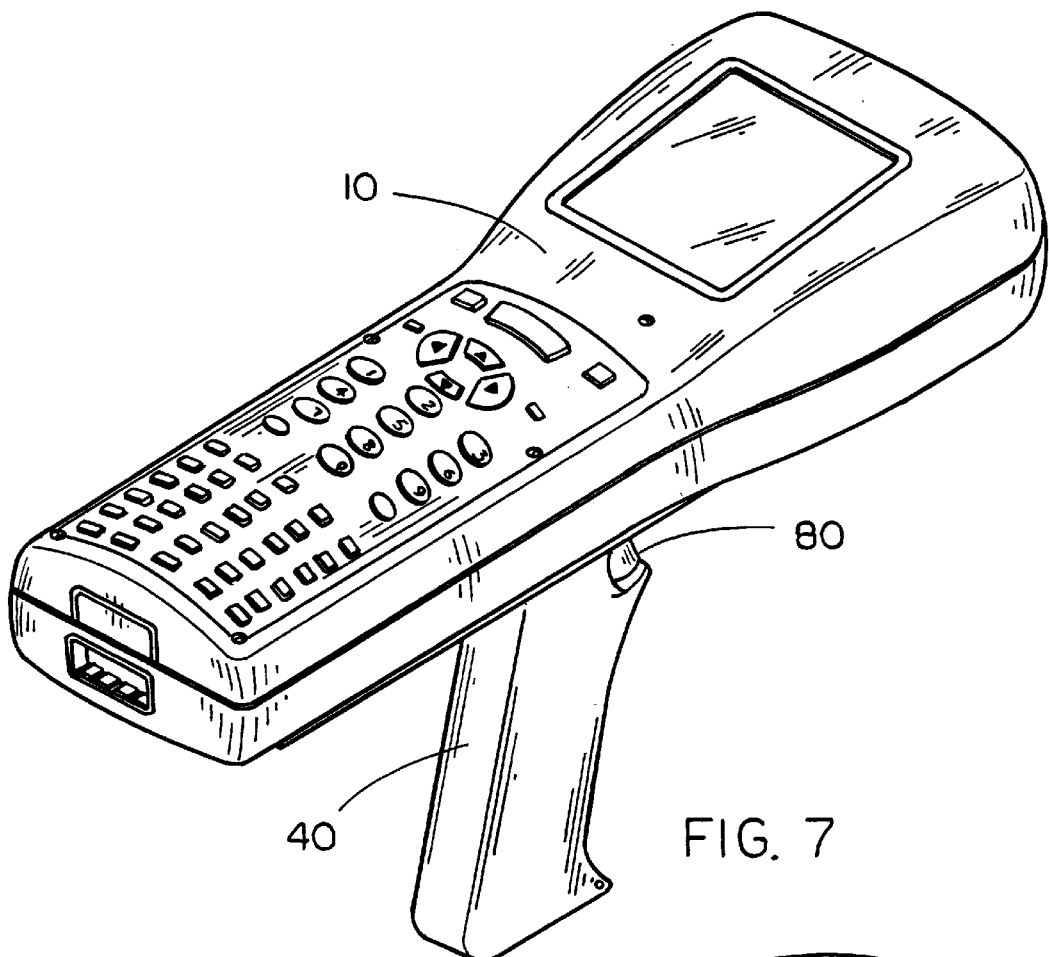
FIGS. 7 and 8 are pictorial and side elevational views respectively illustrating the pistol grip assembly secured to the data terminal.
Figure 8:
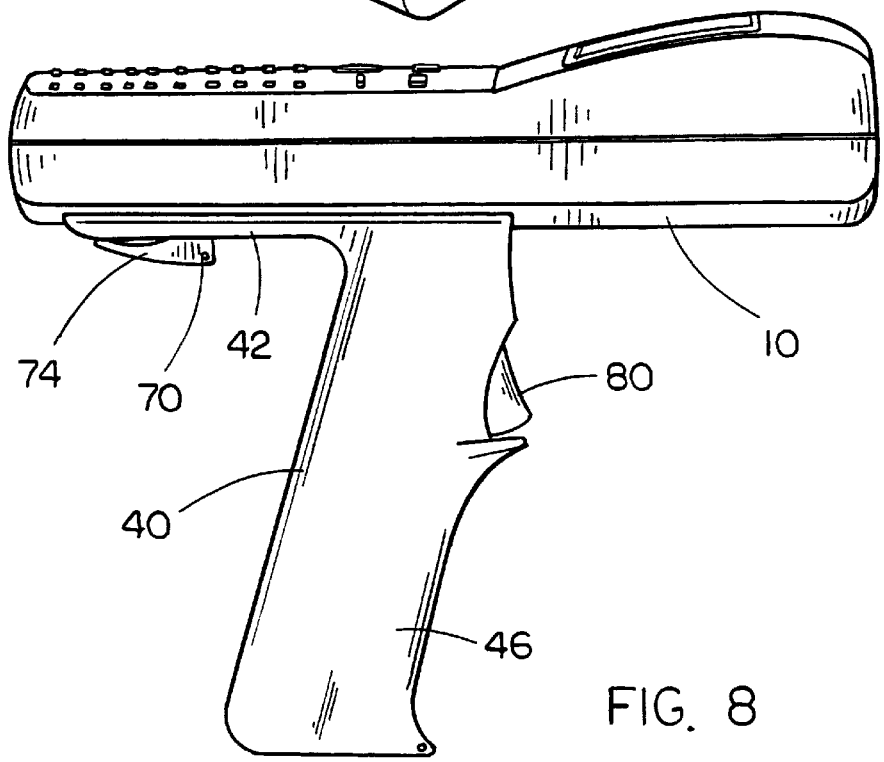

FIGS. 7 and 8 are pictorial and side elevational views respectively illustrating the pistol grip assembly secured to the data terminal. FIG. 8 depicts the lever-type latch 74 rotated to the latched position (flush to the bottom surface of the horizontal mounting plate 42).

Figure 9:
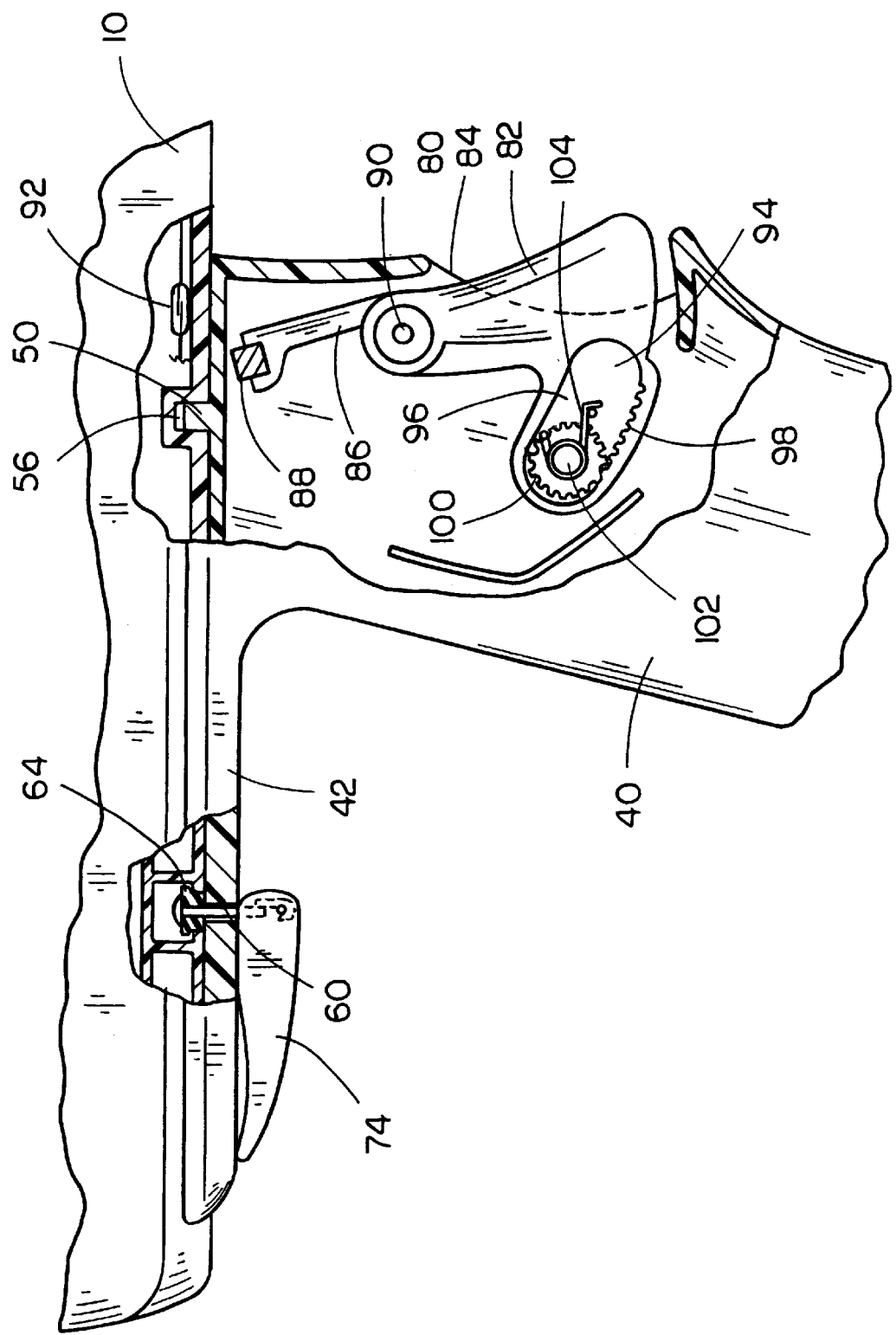
FIG. 9 is a partial cross-sectional side elevational view of the pistol grip assembly attached to the data terminal showing exemplary embodiments of the attachment mechanism and reed switch/magnetic trigger assembly.

FIG. 9 is a partial cross-sectional side elevational view of the pistol grip assembly attached to the data terminal showing exemplary embodiments of the attachment mechanism and reed switch/magnetic trigger assembly. The lever-type latch mechanism 74 is shown in the latched position (flush to the bottom surface of the horizontal mounting plate 42) pulling downward on the guide 60 and compressing the O-ring 64. Tabs 50 are shown inserted into notches 56 in the bottom shell 44 of the data terminal 10.

FIG. 9 also illustrates an exemplary embodiment of a reed switch/magnetic trigger mechanism. Preferably, the pistol grip assembly 40 comprises a trigger mechanism 80 having a trigger 82 which extends through an aperture 84 in the pistol grip assembly 40. The trigger 82 may have a shaft 86 integrally molded onto it. A small magnet 88 may further be attached to the end of the shaft 86 opposite the trigger 82 by an adhesive or the like. Preferably, the trigger mechanism 80 is pivotally mounted within the pistol grip assembly 40 at a point 90 such that when the user depresses the trigger 82, the shaft 86 is rotated in a vertical plane to bring the magnet 88 to rest beneath the reed switch 92. A return mechanism 94 may also be incorporated into the trigger mechanism 80. This return mechanism 94 may comprise a channel 96 having a splined surface 98 onto which a splined wheel 100 may roll. This splined wheel 100 is attached to the pistol grip assembly 40 by an axle 102. A spring 104 may be attached to the pistol grip assembly 40 and to the splined wheel 100. Preferably when the user depresses the trigger 82, the splined wheel 100 rolls in the splined channel 96 coiling the spring 104. When the trigger 82 is released, the spring 104 uncoils rotating the splined wheel 100 in the splined channel 96 and returning the trigger 82 to the undepressed position. FIG. 9 shows the trigger mechanism 80 in the undepressed position with the magnet 88 rotated away from the reed switch 92.

FIG. 10 is a partial cross-sectional side elevational view of the pistol grip assembly attached to the data terminal further illustrating reed switch/magnetic trigger assembly. This view shows the trigger mechanism 80 in the depressed position causing the magnet 88 to be rotated beneath the reed switch 92. The magnet 88 causes the contacts 110 of the reed switch 92 to come together activating the data terminal's optical character set reader or the like.

FIG. 11 is a partial cross-sectional side elevational view of the pistol grip assembly attached to the data terminal further illustrating the attachment mechanism. The lever-type latch mechanism 74 is shown in the unlatched position (perpendicular to the bottom surface of the horizontal mounting plate 42) releasing the guide 60 upward and allowing the O-ring 64 to return to its uncompressed state. The O-ring 64 may then pass through the hole 58 in the bottom shell 44 of the data terminal's housing. Preferably, the holes 54 in the pistol grip assembly's mounting plate 42 are sized to have a smaller diameter than the O-ring 64 to provide retention of the O-ring/guide/lever assembly.

What is claimed:

1. A portable hand-held data terminal, including:

a display portion; and a keypad portion adjacent to said display portion, said keypad portion including:

a top section having a curvilinear shape;

a bottom section joined to said top section, said bottom section having a smooth, unobstructed curvilinear shape adapted to fit comfortably with a palm of a human hand so that a thumb and fingers of said human hand may wrap about said keypad portion; and a plurality of user-activated keys extending from said top section to form a keypad wherein said keypad may be operably manipulated by the thumb and fingers of said human hand to allow single handed operation of said portable data terminal wherein said plurality of user-activated keys includes a scan trigger key, a plurality of numeric keys and a plurality of alphabetic keys, and wherein said scan trigger key protrudes farthest from said top section, said numeric keys protrude next farthest from said top section, and said alphabetic keys protrude least farthest from said top section so that said scan trigger key, said plurality of numeric keys and said plurality of alphabetic keys may be distinguished by touch.

2. The portable hand-held data terminal of claim 1, wherein a face of at least one of said plurality of keys is curved so as to be more easily manipulated by the thumb and fingers of said human hand during single handed operation of said portable data terminal.

3. The portable hand-held data terminal of claim 2, wherein said keys extend to at least two different heights above said top section so that said keys may be tactually distinguishable by the fingers of said human hand.

4. The portable hand-held data terminal of claim 2, wherein said keys are grouped on said top section according to their height.

5. The portable hand-held data terminal of claim 2, wherein said keys have at least two different sizes so that said keys may be tactually distinguishable by the fingers of said human hand.

6. The portable hand-held data terminal of claim 2, wherein said keys are grouped on said top section according to their size.

7. The portable hand-held data terminal of claim 2, wherein the face of said at least one key curves convexly from a lowest point with respect to said top section to a highest point with respect to said top section, and wherein said lowest point is disposed toward the side of said top section and said highest point is disposed toward the center of said top section.

* * * * *